(12) United States Patent
McBeath et al.

(10) Patent No.: US 8,379,622 B2
(45) Date of Patent: Feb. 19, 2013

(54) METHOD AND APPARATUS FOR REUSING PACKET DATA CONTROL ASSIGNMENT BITS FOR RESOURCE ALLOCATION INDICATIONS

(75) Inventors: Sean M. McBeath, Keller, TX (US); Hao Bi, Lake Zurich, IL (US); John D. Reed, Arlington, TX (US); Jack A. Smith, Valley View, TX (US)

(73) Assignee: Motorola Mobility LLC, Libertyville, IL (US)

( * ) Notice: Subject to any disclaimer, the term of this patent is extended or adjusted under 35 U.S.C. 154(b) by 1103 days.

(21) Appl. No.: 11/763,624

(22) Filed: Jun. 15, 2007

(65) Prior Publication Data

US 2008/0310352 A1 Dec. 18, 2008

(51) Int. Cl.
*H04J 3/24* (2006.01)
(52) U.S. Cl. ............... 370/349; 714/746; 714/776
(58) Field of Classification Search .......... 370/329, 370/349; 455/522, 466, 68; 714/746, 776
See application file for complete search history.

(56) References Cited

U.S. PATENT DOCUMENTS

| | | | |
|---|---|---|---|
| 6,370,672 B1 | 4/2002 | Rick et al. | |
| 2001/0044912 A1* | 11/2001 | Francis et al. | 714/30 |
| 2003/0072384 A1* | 4/2003 | Chen et al. | 375/295 |
| 2003/0157953 A1* | 8/2003 | Das et al. | 455/522 |
| 2004/0066766 A1* | 4/2004 | Shiu et al. | 370/335 |
| 2004/0153935 A1* | 8/2004 | Niesen | 714/746 |
| 2005/0213556 A1* | 9/2005 | Wax et al. | 370/349 |
| 2007/0089040 A1* | 4/2007 | Saifuddin et al. | 714/776 |
| 2007/0234134 A1* | 10/2007 | Shao et al. | 714/701 |
| 2008/0259855 A1* | 10/2008 | Yoon et al. | 370/329 |

FOREIGN PATENT DOCUMENTS

| | | |
|---|---|---|
| EP | 1881633 A1 | 1/2008 |
| WO | 0124465 A1 | 4/2001 |
| WO | 2005022814 A | 3/2005 |
| WO | 2005125050 A | 12/2005 |
| WO | 2005125050 A1 | 12/2005 |
| WO | 2006106864 A1 | 10/2006 |
| WO | 2007040330 A | 4/2007 |

OTHER PUBLICATIONS

European Patent Office, "Examination Report", Jul. 12, 2010, pp. 1-9, EPC Pat. Appln. No. 08 770 763.4-1237, Netherlands.
European Patent Office, "Extended Search Report" for Application No. 10001265.7-1237 Jul. 16, 2010, 8 pages.

* cited by examiner

*Primary Examiner* — Jinsong Hu
*Assistant Examiner* — Nathan Taylor

(57) ABSTRACT

The PDCAB packet (300) and the RRA packet (308) are transmitted together on the F-SCCH. For example, 9 RRA bits (305) are appended to the PDCAB field (303), in place of the pad bits (205), thereby allowing both the PDCAB (303) and RRA (311) messages to be protected against errors by a 16-bit CRC (307). In accordance with the embodiments, a receiver is able to distinguish between the varying PDCAB (303) and RRA (305) message formats and transmitting the packets (300) and (308) together is a normal mode of operation in the embodiments. Therefore, in accordance with the embodiments, when the PDCAB packet (300) and RRA packet (308) are transmitted together, the network replaces the N PDCAB pad bits, such as pad bits (205), with the first N bits from the RRA bitmap (311), in order to use the nominal CRC length for both packets (300) and (308).

10 Claims, 5 Drawing Sheets

METHOD AND APPARATUS FOR REUSING PACKET DATA CONTROL ASSIGNMENT BITS FOR RESOURCE ALLOCATION INDICATIONS

FIELD OF THE DISCLOSURE

The present disclosure relates generally to wireless communication networks wherein data communications and Voice-Over-Internet-Protocol (VoIP) communications are supported, and more particularly to such networks utilizing Orthogonal Frequency Division Multiplexed (OFDM) radio interfaces and various methods and apparatuses for allocating resources, such as, but not limited to, time-frequency resources, to mobile stations communicating via such networks.

BACKGROUND

In the $3^{rd}$ Generation Partnership Project 2 (GPP2) Ultra Mobile Broadband (UMB) standard, the Forward Shared Control Channel (F-SCCH) can transmit from the Access Network (AN) to the Access Terminal (AT), or mobile station, a 40-bit packet containing a Packet Data Control Assignment Block (PDCAB) or a 40-bit packet containing a Residual Resource Allocation (RRA) block. The 40-bit design constraint is problematic in that the 12-bit PDCAB requires padding, which creates an inefficiency, and in that the 30-bit RRA block can only be protected by a very short Cyclic Redundancy Check (CRC) string which is less likely to detect channel errors than would be the case if using a longer CRC. Because the F-SCCH sends control information, channel error detection and correct is of particular concern.

Therefore what is needed is a method and apparatus for better utilizing the bandwidth consumed by transmission of bits, so that a longer CRC may be employed with respect to control channel information.

DETAILED DESCRIPTION

Figure 1:
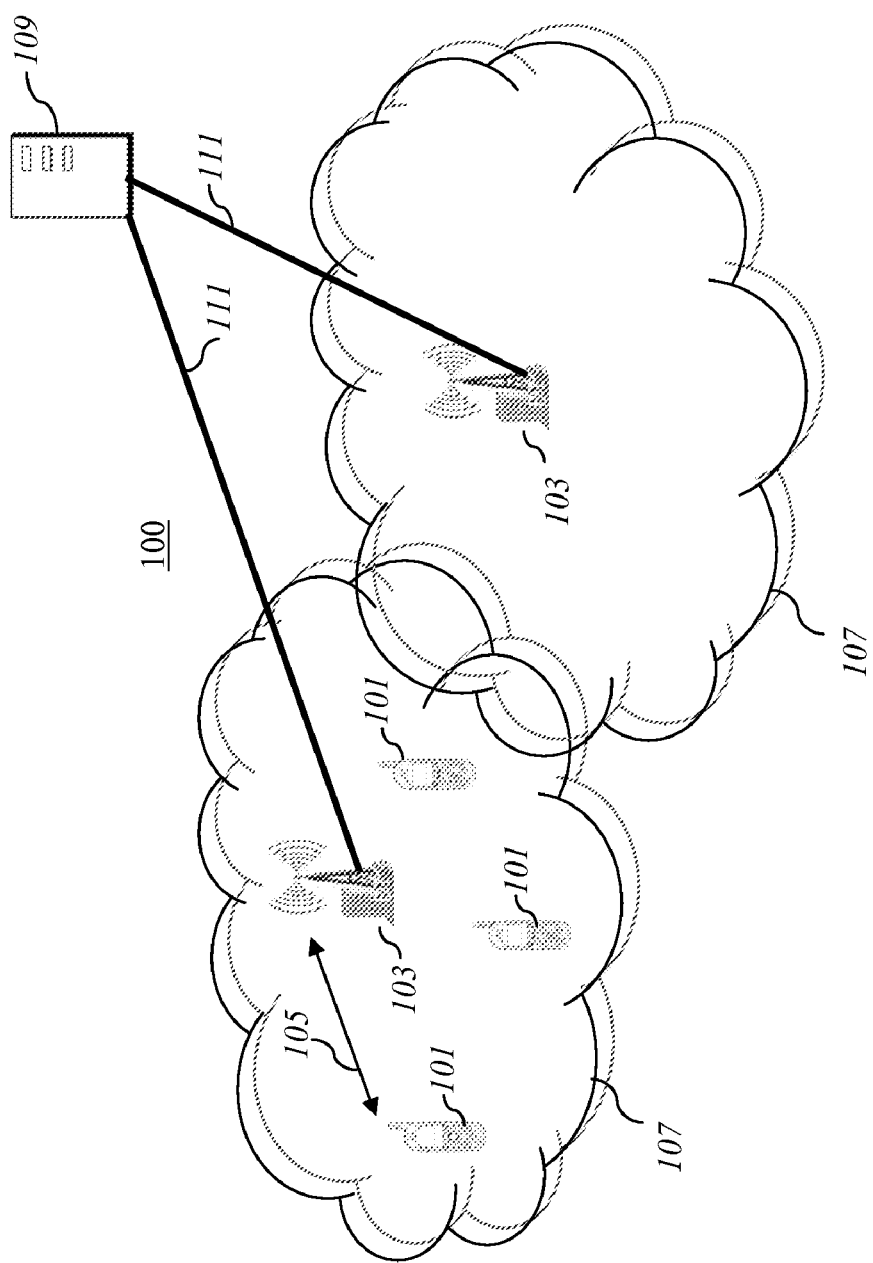
FIG. 1 is a block diagram of a wireless communication network in accordance with the embodiments.

Turning now to the drawings wherein like numerals represent like components, FIG. 1 illustrates a communications network 100, with various base stations 103, each base station 103 having a corresponding coverage area 107. In general, base station coverage areas may overlap and, in general, form an overall network coverage area. The base stations may be referred to by other names such as base transceiver station (BTS), "Node B", and access node (AN), depending on the technology. A network coverage area may comprise a number of base station coverage areas 107, which may form a contiguous radio coverage area. However, it is not required to have contiguous radio coverage and therefore a network coverage area may alternatively be distributed.

Furthermore, each coverage area may have a number of mobile stations 101. Mobile stations may also be referred to as access terminals (ATs), user equipment (UEs), or other terminology depending on the technology. A number of bases stations 103 will be connected to a base station controller 109 via backhaul connections 111. The base station controller 109 and base stations form a Radio Access Network (RAN). The overall network may comprise any number of base station controllers, each controlling a number of base stations. Note that the base station controller 109 may alternatively be implemented as a distributed function among the base stations 103. Regardless of specific implementations, the base station controller 109, or some other appropriate network entity, such as, but not limited to a base station, comprises various modules for packetized communications such as a packet scheduler, packet segmentation and reassembly, etc., and modules for assigning appropriate radio resources to the various mobile stations 101.

The base stations 103 may communicate with the mobile stations 101 via any number of standard air interfaces and using any number of modulation and coding schemes. For example, Universal Mobile Telecommunications System (UMTS), Evolved UMTS (E-UMTS) Terrestrial Radio Access (E-UTRA) or CDMA2000™ may be employed. Further, Orthogonal Frequency Division Multiplexing (OFDM) and/or orthogonal spreading codes such as the Walsh codes may be employed for channelization of the air interface. Semi-orthogonal spreading codes may also be utilized to achieve additional channelization over the air interface. Any appropriate radio interface may be employed by the various embodiments.

The radio resources of the communications network, which may be time-frequency resources as would be the case for communications networks employing OFDM, are assigned to the mobile stations via a bit map. Further, mobile stations may be assigned to groups such that blocks of resources are shared among the group. Such bit maps, mobile station grouping and shared resource assignments are described in copending U.S. patent application Ser. No. 11/460,908 "APPARATUS AND METHOD FOR HANDLING CONTROL CHANNEL RECEPTION/DECODING FAILURE IN A WIRELESS VoIP COMMUNICATION SYSTEM," U.S. patent application Ser. No. 11/464,179 "APPARATUS AND METHOD FOR AUTOMATIC REPEAT REQUEST WITH REDUCED RESOURCE ALLOCATION OVERHEAD IN A WIRELESS VOIP COMMUNICATION SYSTEM," and U.S. patent application Ser. No. 11/530,352 "APPARATUS AND METHOD FOR AUTOMATIC REPEAT REQUEST SIGNALLING WITH REDUCED RETRANSMISSION INDICATIONS IN A WIRELESS VOIP COMMUNICATION SYSTEM," all three of which are assigned to the same assignee as the present application, and all three of which are hereby incorporated by reference herein.

Figure 2:
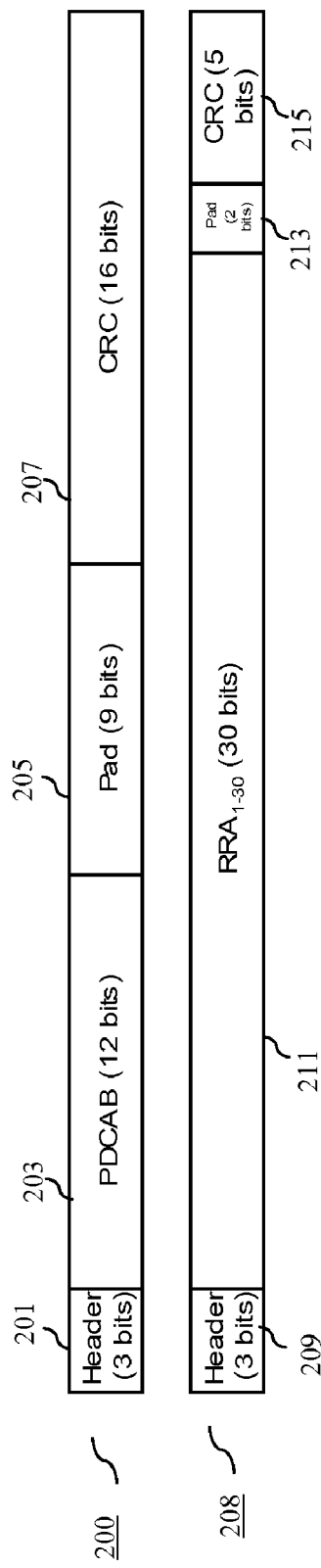
FIG. 2 are bit map diagrams of a control packets of previous communications networks.

Two bit maps of concern to the various embodiments are sent to the mobile stations on a control channel, specifically the Forward Shared Control Channel (F-SCCH), and are illustrated in FIG. 2. Thus for bitmap-based assignments, the communication network may assign a mobile station to a particular frequency domain resource, where certain bit positions in the bitmap correspond to a frequency domain resource. The mobile station may thus use the bitmap to determine which frequency domain resources are currently being used, and determine its own assignment as the original frequency domain resources available minus those frequency domain resources that are indicated as currently being used by the bitmap.

Returning to FIG. 2, the Forward Shared Control Channel (F-SCCH) may transmit from the communications network to the mobile station, a 40-bit packet 200 containing a Packet Data Control Assignment Block (PDCAB) 203, which refers to segments of the forward link control channel, or a 40-bit packet 208 containing a Residual Resource Allocation (RRA) block 211, which refers to resource or channel nodes from a channel tree. Some of the mobile stations 101 may require only the PDCAB information and some mobile stations may require only the RRA information, although all mobile stations in accordance with the various embodiments have the capability to receive a PDCAB packet and an RRA packet together.

For purposes of the example illustrated by FIG. 2, the PDCAB 203 is assumed to be a length 12 bitmap corresponding to 12 control segments, and the RRA bitmap 211 is assumed to be a length 30 bitmap corresponding to 30 nodes from a channel tree. Both of these assumed bitmaps are typical values for a 5 MHz system and thus serve the purpose of example in FIG. 2. FIG. 2 therefore depicts how the 40-bit packets 200 and 208 are structured to contain a PDCAB 203 block or an RRA 211 block in current systems for transmission over the F-SCCH.

Both the PDCAB packet 200 and RRA packet 208 have 3 bit headers 201 and 209, respectively. These 3 bit "block type" headers indicate the type of information that follows in subsequent blocks. Specifically, the PDCAB packet 200 has 12 PDCAB information bits in PDCAB block 203, 9 pad bits 205, and 16 CRC bits 207 to achieve the desired packet length of 40 bits.

The RRA packet 208 has 30 RRA information bits 211. Therefore, because of the 40 bit constraint, a reduced CRC 215 must be used. For the example illustrated, 2 pad bits 213 and a reduced CRC of 5 bits 215 are utilized to achieve the 40 bit packet length. It is to be understood that in light of the 40 bit packet length of packet 200 and packet 208, only 2 CRC lengths are permissible, that is, 16 bits or 5 bits. Because the control channel size is fixed, if a block has fewer information bits than are supported using the nominal CRC, zero bits are added to the information bits to achieve the desired length. If a block has more information bits than would be supported using a nominal CRC, the CRC length is reduced to 5 bits, and, if necessary, zero bits are added to the information bits to achieve the desired length. It is undesirable to reduce the CRC length, since this increases the probability of error. In general, the first packet for PDCAB information will have a CRC length of n-bits, while the second packet for RRA information will have a shorter CRC length of (n−x) bits.

Figure 3:
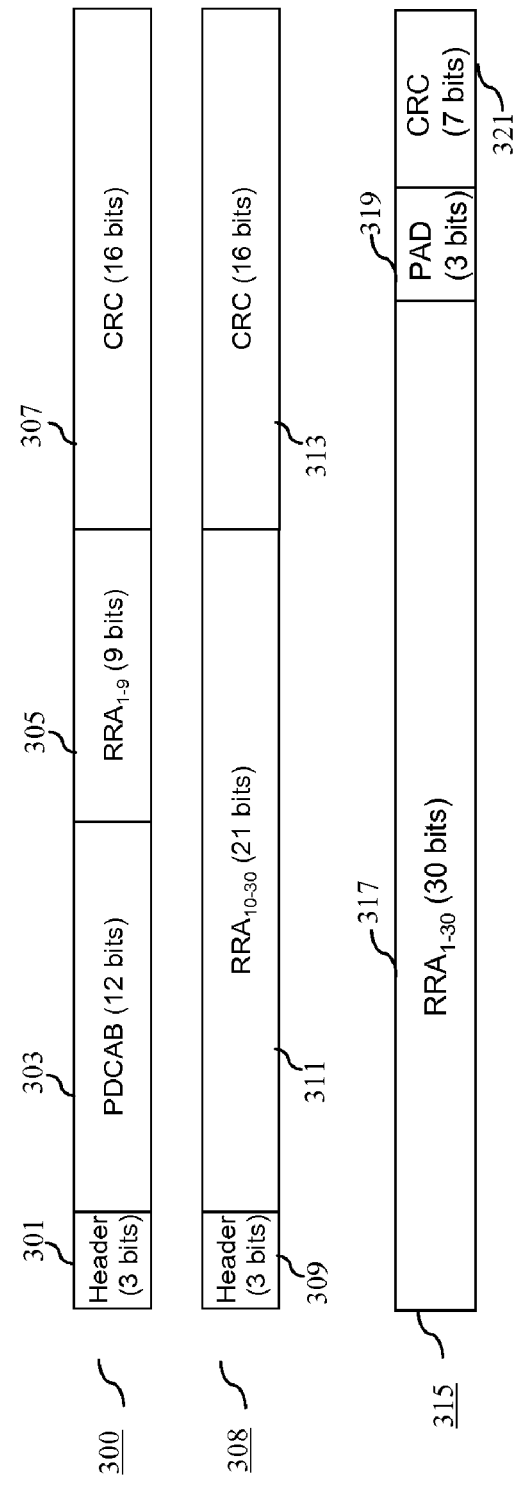
FIG. 3 are bit map diagrams of the control packets of FIG. 2 in accordance with the embodiments.

FIG. 3 illustrates the PDCAB packet 300 and the RRA packet 308 and RRA packet 315 in accordance with the embodiments. In FIG. 3, and in accordance with one embodiment, the packets 300 and 308 are transmitted simultaneously on the F-SCCH. In the example case illustrated by FIG. 3, 9 RRA bits 305 are appended to the PDCAB field 303, in place of the pad bits 205, thereby allowing both the PDCAB 303 and RRA 311 messages to be protected against errors by a 16-bit CRC 307. Therefore, in accordance with the embodiments, a receiver is able to distinguish between the varying message formats for PDCAB and RRA bitmaps. Furthermore, transmitting the packets 300 and 308 simultaneously is a normal mode of operation in accordance with the embodiments.

Therefore, in accordance with the embodiments, when the PDCAB packet 300 and RRA packet 308 are simultaneously transmitted, the communications network replaces the N PDCAB pad bits, such as pad bits 205, with the first N bits from an overall RRA bitmap, that is, the combination of RRA bitmaps 305 and 311, in order to use the nominal CRC length for both packets 300 and 308. Thus the RRA bitmap 305 defines the first portion of an overall RRA bitmap which is completed by the second portion RRA bitmap 311. More specifically the overall RRA bitmap is divided into the first portion RRA bitmap 305 and the second portion RRA bitmap 311, whereby the two portions are sent in the two packets 300 and 308, respectively.

Therefore, in FIG. 3, the first 9 bits of the RRA block 311 replace the pad bits 205, as previously illustrated in FIG. 2, in the PDCAB packet 300, leaving 21 bits for the RRA block 311 in RRA packet 308. The 21 RRA bits 311 fit perfectly in the nominal F-SCCH packet space of 40 bits, thereby allowing the nominal CRC length of 16 bits 313 to be employed for the RRA packet 308. This increased CRC length for the RRA packet 308 decreases the probability of error, without requiring any additional overhead with respect to the communications network.

It is therefore to be understood that, also in accordance with the embodiments, if the RRA block 311 has fewer bits than the PDCAB pad bits space, the RRA packet 308 of the F-SCCH does not need to be transmitted because the entire RRA block 311 would fit into the RRA block 305 of the PDCAB packet 300. Therefore, in the embodiments, there may be cases when only the single PDCAB packet 300 is transmitted because the PDCAB packet 300 contains the PDCAB block 303 and the completed RRA block 305. This may be accomplished in some embodiments, by an appropriate header 301 bit configuration such that the combined PDCAB 303 and RRA 305 blocks are expected by the receiver.

Further in accordance with the embodiments, the communications network need not always simultaneously transmit the PDCAB packet 300 and the RRA packet 308. The two packets may be transmitted separately at different times. Therefore, the F-SCCH transmission discussed above with respect to FIG. 3 may also be applied when the communications network transmits the PDCAB packet 300 and the RRA packet 308 at different times, and where the mobile station buffers the packet and processes them together.

An alternative or additional packet type for sending RRA information is packet 315. Packet 315 is RRA information 317 and a shorter CRC block, for example a 7 bit CRC or a 5 bit CRC block 321. Therefore, packet 315 may serve as a RRA continuation packet for packet 300, packet 308 or a combination of both.

In some embodiments the packet 315 may be used to send an RRA bitmap independently from a PDCAB bitmap. In one specific embodiment, packet 315 is used in combination with packet 200, wherein packet 200 contains only PDCAB information and packet 315 contains only RRA information, however packet 315 does not employ header information and therefore has additional room for CRC bits 321. Note that pad bits 319 may also be utilized in packet 315 depending upon the size of CRC employed.

It is to be understood that FIG. 2 and FIG. 3 are exemplary only and are based on a hypothetical 5 MHz bandwidth. Therefore, smaller or larger bandwidths may be employed resulting in smaller or larger packet bit lengths, and remain within the scope of the various embodiments disclosed herein. It is also to be understood that, in light of the exemplary nature of FIG. 2 and FIG. 3, a first packet for PDCAB information will have a CRC length of n-bits, while some packets for RRA information (208 and 315) will have a shorter CRC length of (n−x) bits and that the actual number of CRC bits employed may be dependent upon various factors such as bandwidth and the quantity of information to be transmitted in the PDCAB and/or RRA messages. Thus various CRC bit lengths may be employed in accordance with the various embodiments herein disclosed.

Figure 4:
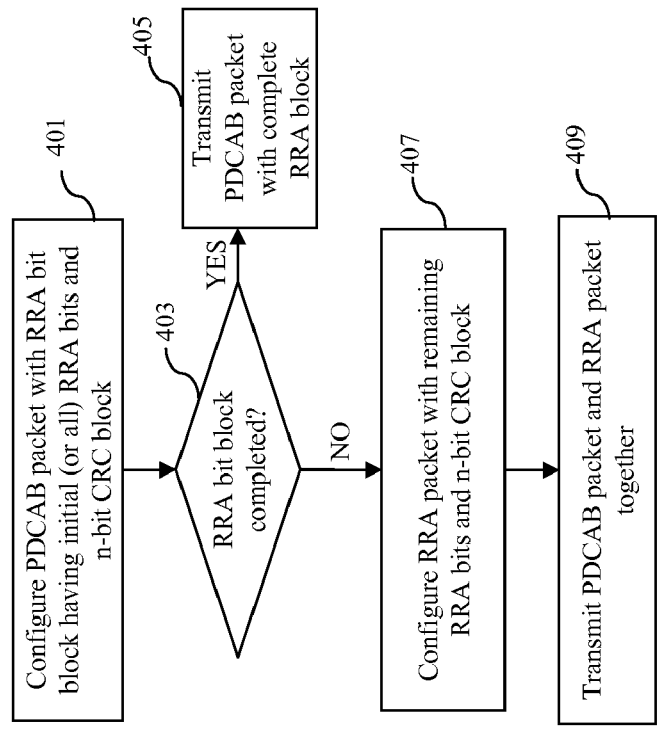
FIG. 4 is a flow chart illustrating operation of a base station in accordance with the embodiments.

FIG. 4 illustrates the operation of a base station in accordance with the embodiments and the above description. In 401, a PDCAB packet may be configured to include RRA bits in the position that would have been used as pad bits in previous systems. In 403, if the number of RRA bits is small enough, the information contained in the PDCAB packet may contain complete RRA information and also a 16 bit RRA block. If this is the case, then in 405 the base station will transmit the PDCAB packet having the complete RRA information block.

If there is additional RRA information to transmit, then in 407 an RRA packet will be configured having the remaining RRA bits and also a 16 bit CRC block. In 409, the PDCAB packet and RRA packet will be transmitted together.

In addition to the operations illustrated by FIG. 4, the communications network, specifically the base station of the embodiments, will set its transmit power of the PDCAB bitmap block to reach mobile stations targeted by the PDCAB block as well as the RRA block, since the PDCAB packet may contain RRA bits as discussed above.

Figure 5:
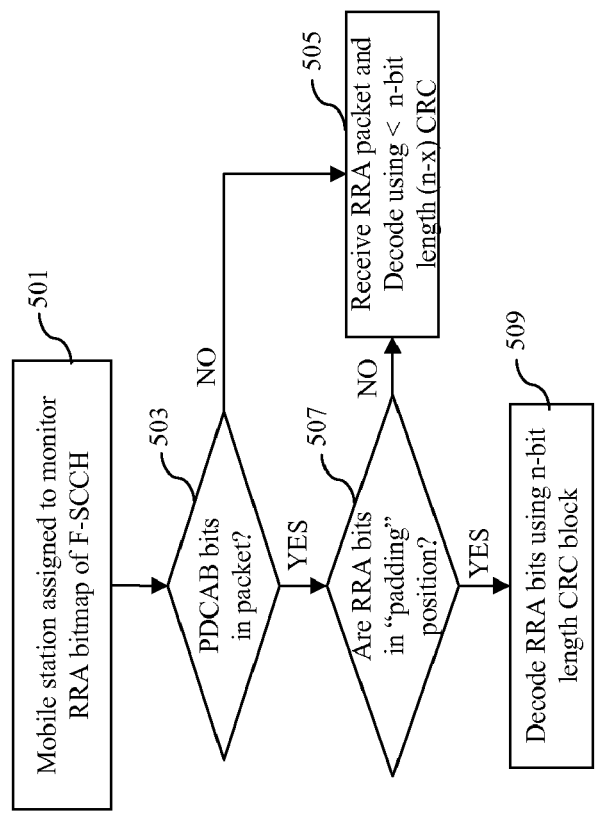
FIG. 5 is a flow chart illustrating operation of a mobile station in accordance with the embodiments.

FIG. 5 illustrates operation of a mobile station in accordance with the embodiments with respect to handling an F-SCCH. In 501, a mobile station may be assigned to monitor the RRA bitmap of the F-SCCH. If the mobile station detects PDCAB bits in 503, then the packet will also be checked for RRA bits in 507. If RRA bits are contained in the packet, then the mobile station may proceed to decode the RRA bits in 509 using the 16 bit CRC block which is also contained in the packet.

If no PDCAB bits are detected in 503 or if no RRA bits are detected in 507, then either the packet of 503 is a RRA packet only and will be decoded using a 5 bit CRC in 505, or, from 507, the RRA packet will follow subsequently to the PDCAB packet of 507 and will be received and decoded in 505.

For a mobile station assigned to monitor the PDCAB bitmap, it will ignore all bit positions beyond the last PDCAB bitmap position as would previous systems.

Figure 6:
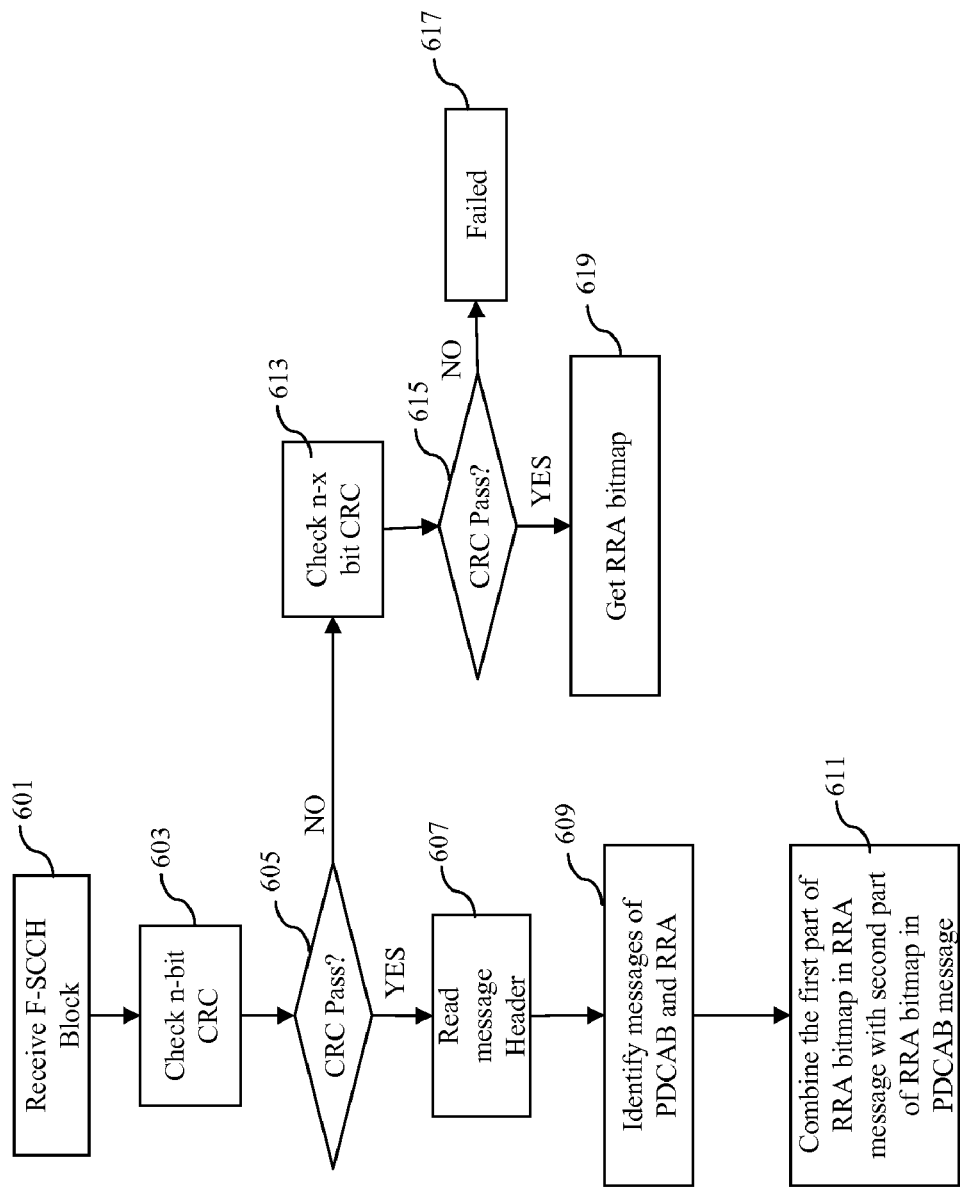
FIG. 6 is a flow chart illustrating further details of operation of a mobile station in accordance with the embodiments.

FIG. 6 is a flow chart illustrating further details of operation of a mobile station in accordance with the embodiments. After an F-SCCH packet is received in 601, the mobile station may attempt to decode any data blocks contained therein by assuming that the last bits of the packet define a 16 bit CRC. The data may pass the 16 bit CRC, which indicates to the mobile station that the packet is one of the packets illustrated by FIG. 3, that is, a packet 300 having a PDCAB 303 portion and a RRA 305 portion, or a packet 308 having a RRA 311 portion only.

Therefore, the mobile station may proceed to read the header, which may be header 301 or header 309, to determine the message types contained as in 609. For the two packets, 300 and 308, the mobile station will combine the RRA block 305 with RRA block 311 to complete the RRA message. Returning to FIG. 6, if the 16 bit CRC of 605 fails, then the mobile station may apply a 5 bit CRC in 613, by assuming that the last bits of the packet define a 5 bit CRC as illustrated by packet 315 of FIG. 3. If the 5 bit CRC in 615 is successful then in 619 the mobile station has obtained the RRA bitmap 317. However, if the 5 bit CRC 615 fails then a decoding failure has occurred as shown in 617 and no further action is taken until a new packet is received.

It is to be noted that, a packet such as 315 may be utilized to send RRA information subsequent to sending a PDCAB packet 200, or to send a continuation of RRA information bits without the need for a header, which saves 3 bits for information. The CRC determination allows the mobile station to look for header information only in the event that a 16 bit CRC is successful. Otherwise, if the 5 bit CRC is successful as discussed with respect to FIG. 6, the mobile station may conclude that the packet contains only RRA information 317 as illustrated by packet 315 of FIG. 3.

As was discussed previously with respect to FIG. 1 and FIG. 2, some mobile stations 101 may require only the PDCAB information and some mobile stations may require only the RRA information, however all mobile stations of the various embodiments may receive both a PDCAB packet and an RRA packet together. Therefore, with respect to FIG. 6, block 603 the mobile station may have received a first packet, for example a PDCAB packet, and also a second packet, for example a RRA packet. If mobile station only requires RRA information, the mobile station may, in 603, first decode the second packet by assuming the last bits of the packet define an n-bit length CRC. In the previous examples provided with respect to FIG. 2 and FIG. 3, a 5 Mhz system was assumed and a 16 bit length CRC was assumed given a 40 bit length RRA (or PDCAB) packet length, the packet length being based upon the assumed 5 Mhz bandwidth.

Returning to FIG. 6, the mobile station requiring only RRA information may, in 603, first decode the second packet using the n-bit length CRC as discussed above. If the packet passes the CRC and is thus successfully decoded, then the mobile station may read the packet header which will inform the mobile station that the packet is a RRA packet.

In this case, the mobile station will expect that the first received packet may be a packet having combined PDCAB and RRA information. Therefore, the mobile station will then attempt to decode the first packet, by now assuming that the last bits of the first packet also define a CRC of the same length, such as 16 bits per the examples provided, as the CRC length of the RRA packet. Therefore, if the CRC passes and the mobile station therefore successfully decodes the first packet, the mobile station will proceed to read the first packet's header in 607 and then proceed to obtain the RRA information, by distinguishing the RRA information from the PDCAB information also contained in the packet as in 609. The mobile station may then combine the first packet RRA information portion with the second packet RRA information portion to obtain the complete RRA message.

Figure 8:
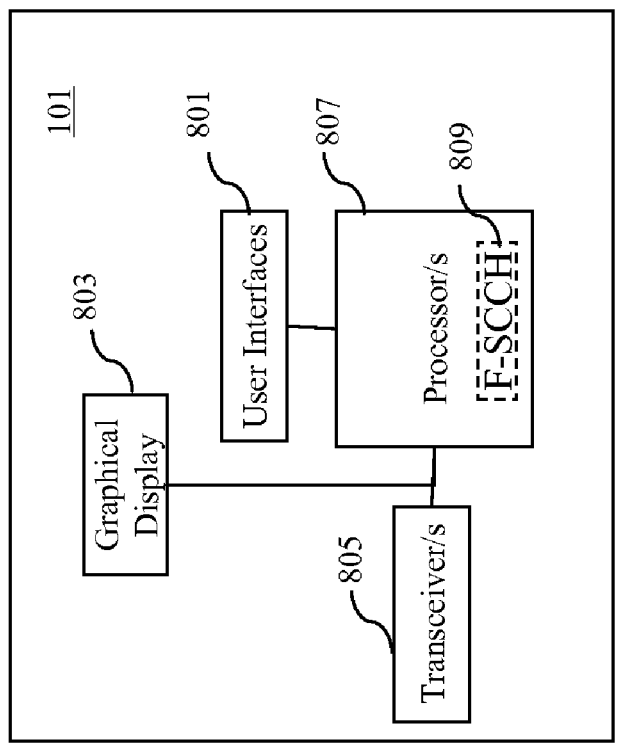
FIG. 8 is a high level block diagram illustrating the components of a mobile station in accordance with the embodiments.
Figure 7:
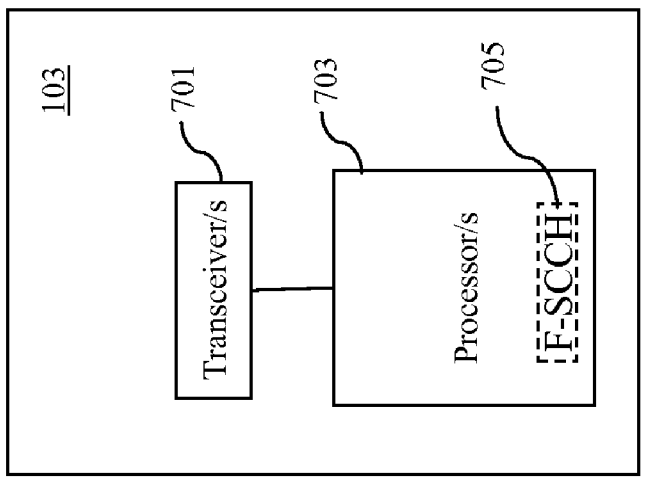
FIG. 7 is a high level block diagram illustrating the components of a base station in accordance with the embodiments.

FIGS. 7 and 8 are block diagrams that illustrate the primary components of a base station 103 and mobile station 101, respectively, in accordance with the embodiments. Base station 103 comprises transceiver/s 701 coupled to processors 703. Processors 703 run a F-SCCH module 705 for configuring PDCAB packets and RRA packets in accordance with the embodiments.

Mobile station 101 comprises user interfaces 801, and processor/s 807. Processor/s 807 run a F-SCCH module 809 for decoding PDCAB packets and RRA packets in accordance with the embodiments. Mobile station also comprises user interfaces 803, which may be a combination of user interfaces including but not limited to a keypad, touch screen, voice activated command input, and gyroscopic cursor controls, a graphical display 803, which may also have a dedicated processor and/or memory, drivers etc. which are not shown in FIG. 8, and transceiver/s 805.

It is to be understood that FIGS. 7 and 8 are for illustrative purposes only and are for illustrating the main components of a base station and mobile station in accordance with the present disclosure, and are not intended to be a complete schematic diagrams of the various components and connections therebetween required for a base station or mobile station. Therefore, a base station and/or mobile station may comprise various other components not shown in FIG. 7 and/or FIG. 8 and still be within the scope of the present disclosure.

While various embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a mobile station, the method comprising:
    determining that a first received packet contains a first message type and a first portion of a second message type, wherein the first message type contains a Packet Data Control Assignment Block (PDCAB) and the second message type contains Residual Resource Allocation (RRA) block;
    determining that a second received packet contains a second portion of said second message type;
    combining said first portion and said second portion to complete said second message type;
    setting a predetermined number of bits at the end of said second received packet as a first n-bit length Cyclic Redundancy Check (CRC) block;
    decoding successfully said second received packet using said first n-bit length CRC block;
    reading a header of said second received packet in response to said decoding successfully said second received packet;
    determining that said second received packet contains said second portion of said second message type via said header;
    setting a predetermined number of bits at the end of said first received packet as a second n-bit length Cyclic Redundancy Check (CRC) block;
    decoding successfully said first received packet using said second n-bit length CRC block;
    reading a header of said first received packet in response to said decoding successfully said first received packet; and
    obtaining said first portion of said second message from said first packet in response to said decoding successfully said first received packet.

2. The method of claim 1, wherein the step of determining that a first received packet contains a first message type and a first portion of a second message type further comprises:
    decoding successfully said second received packet to obtain said second portion of said second message type;
    determining by said decoding successfully of said second received packet that said first received packet contains a Packet Data Control Assignment Block (PDCAB), said PDCAB being said first message type; and
    determining by said decoding successfully that said first received packet contains a Residual Resource Allocation (RRA) block first portion, said RRA block first portion being said first portion of said second message type.

3. A method in a mobile station, the method comprising:
    receiving a first packet and a second packet, said first packet and said second packet having an equal bit length;
    setting a predetermined number of bits at the end of said second received packet as a first length Cyclic Redundancy Check (CRC) block;
    decoding said second received packet using said first length CRC block, said decoding resulting in a failure;
    setting a second predetermined number of bits at the end of said second received packet as a second length Cyclic Redundancy Check (CRC) block based on failure of said decoding, said second length CRC block shorter than said first length CRC block; and
    decoding successfully said second received packet using said second length CRC block.

4. The method of claim 3, further comprising:
    determining that said second received packet contains a message required by said mobile station in response to said decoding successfully said second received packet using said second length CRC block, said message being complete; and
    discarding said first packet.

5. The method of claim 3, further comprising:
    determining that said second received packet contains a second portion of a message required by said mobile station, in response to said decoding successfully said second received packet using said second length CRC block, said message being incomplete;
    setting a predetermined number of bits at the end of said first received packet as a second length Cyclic Redundancy Check (CRC) block, said second length CRC block longer than said first length CRC block;
    decoding successfully said first received packet using said second length CRC block, to obtain a first portion of said message; and
    combining said first portion and said second message to obtain said message required by said mobile station.

6. A mobile station comprising: at least one transceiver; at least one processor coupled to said transceiver; said processor configured to:
    determine that a first received packet contains a first message type and a first portion of a second message type, wherein the first message type contains a Packet Data Control Assignment Block (PDCAB) and the second message type contains Residual Resource Allocation (RRA) block;
    determine that a second received packet contains a second portion of said second message type;
    combine said first portion and said second portion to complete said second message type;
    set a predetermined number of bits at the end of said second received packet as a first n- bit length Cyclic Redundancy Check (CRC) block;
    decode successfully said second received packet using said first n-bit length CRC block;
    read a header of said second received packet in response to said decoding successfully said second received packet;
    determine that said second received packet contains said second portion of said second message type via said header;
    setting a predetermined number of bits at the end of said first received packet as a second n-bit length Cyclic Redundancy Check (CRC) block;
    decode successfully said first received packet using said second n-bit length CRC block;

read a header of said first received packet in response to said decoding successfully said first received packet; and obtain said first portion of said second message from said first packet in response to said decoding successfully said first received packet.

7. The mobile station of claim 6, wherein said processor is further configured to:

decode successfully said second received packet to obtain said second portion of said second message type;

determine by said decoding successfully of said second received packet that said first received packet contains a Packet Data Control Assignment Block (PDCAB), said PDCAB being said first message type; and determine by said decoding successfully that said first received packet contains a Residual Resource Allocation (RRA) block first portion, said RRA block first portion being said first portion of said second message type.

8. A mobile station comprising:

at least one transceiver;

at least one processor coupled to said transceiver; said processor configured to:

receive a first packet and a second packet, said first packet and said second packet having an equal bit length;

set a predetermined number of bits at the end of said second received packet as a first length Cyclic Redundancy Check (CRC) block;

decode said second received packet using said first length CRC block, said decoding resulting in a failure;

set a second predetermined number of bits at the end of said second received packet as a second length Cyclic Redundancy Check (CRC) block based on failure of said decoding, said second length CRC block shorter than said first length CRC block; and decode successfully said second received packet using said second length CRC block.

9. The mobile station of claim 8, wherein said processor is further configured to:

determine that said second received packet contains a message required by said mobile station in response to said decoding successfully said second received packet using said second length CRC block, said message being complete; and discard said first packet.

10. The mobile station of claim 8, wherein said processor is further configured to:

determine that said second received packet contains a second portion of a message required by said mobile station, in response to said decoding successfully said second received packet using said second length CRC block, said message being incomplete;

set a predetermined number of bits at the end of said first received packet as a second length Cyclic Redundancy Check (CRC) block, said second length CRC block longer than said first length CRC block;

decode successfully said first received packet using said second length CRC block, to obtain a first portion of said message; and combine said first portion and said second message to obtain said message required by said mobile station.

* * * * *

UNITED STATES PATENT AND TRADEMARK OFFICE
CERTIFICATE OF CORRECTION

PATENT NO. : 8,379,622 B2  
APPLICATION NO. : 11/763624  
DATED : February 19, 2013  
INVENTOR(S) : Sean M. McBeath et al.

Page 1 of 1

It is certified that error appears in the above-identified patent and that said Letters Patent is hereby corrected as shown below:

In the Claims

Col. 8, line 38, please replace "said second message" with --said second portion--.

Signed and Sealed this
Twenty-fifth Day of August, 2015

Michelle K. Lee
*Director of the United States Patent and Trademark Office*